US010955710B2

(12) United States Patent
Tsuei et al.

(10) Patent No.: US 10,955,710 B2
(45) Date of Patent: Mar. 23, 2021

(54) DISPLAY PANELS AND ELECTRONIC DEVICES

(71) Applicant: InnoLux Corporation, Miao-Li County (TW)

(72) Inventors: Bo-Chin Tsuei, Miao-Li County (TW); Hsia-Ching Chu, Miao-Li County (TW); Ming-Chien Sun, Miao-Li County (TW); Kuei-Ling Liu, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 16/791,602

(22) Filed: Feb. 14, 2020

(65) Prior Publication Data

US 2020/0183235 A1 Jun. 11, 2020

Related U.S. Application Data

(63) Continuation of application No. 15/284,224, filed on Oct. 3, 2016, now abandoned.

(30) Foreign Application Priority Data

Oct. 14, 2015 (TW) ................................ 104133650

(51) Int. Cl.
*G02F 1/1335* (2006.01)
*G02F 1/1343* (2006.01)
*G02F 1/1333* (2006.01)
*G02F 1/1362* (2006.01)
*G06F 3/041* (2006.01)

(52) U.S. Cl.
CPC ..... *G02F 1/134327* (2013.01); *G02F 1/13338* (2013.01); *G02F 1/134363* (2013.01); *G02F 1/136286* (2013.01); *G06F 3/0412* (2013.01); *G02F 2001/134318* (2013.01); *G02F 2001/134372* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2014/0085582 A1* 3/2014 Chang ............... G02F 1/133345
349/138
2015/0062522 A1* 3/2015 You ................... G02F 1/134363
349/143

* cited by examiner

*Primary Examiner* — Richard H Kim
(74) *Attorney, Agent, or Firm* — McClure, Qualey & Rodack, LLP

(57) ABSTRACT

A display panel includes a first scan line and a second scan line adjacent to the first scan line disposed on the first substrate. A common electrode line is adjacent to the first scan line or the second scan line. The common electrode line has an enlarged portion, and an extending direction of the common electrode line is substantially the same as an extending direction of the first scan line. A first data line and a second data line adjacent to the first data line are disposed on the first substrate. In a direction perpendicular to the extending direction of the common electrode line, the enlarged portion has a maximum width, a part of the common electrode line overlapping the first data line has a maximum width, and the maximum width of the enlarged portion is greater than the maximum width of the first data line.

18 Claims, 12 Drawing Sheets

DISPLAY PANELS AND ELECTRONIC DEVICES

CROSS REFERENCE TO RELATED APPLICATIONS

This application is a Continuation of application Ser. No. 15/284,224, filed Oct. 3, 2016, which claims priority of Taiwan Patent Application No. 104133650, filed on Oct. 14, 2015, the entirety of which is incorporated by reference herein.

BACKGROUND

Field of the Invention

The present disclosure relates to display panel technology, and in particular to the configuration of a pixel electrode and a common electrode of a wide-viewing angle liquid-crystal display panel and an electronic device including the display panel.

Description of the Related Art

In recent years, liquid-crystal displays (LCDs) have found extensive application in various electronic devices such as notebooks, tablet computers, and cell phones due to their advantages, which include being thin and lightweight, and having low power consumption. In addition, for application in large displays, they require the characteristics of having fast response times, being high contrast, and having a wide-viewing angle. LCDs such as in-plane switching (IPS) LCDs and fringe field switching (FFS) LCDs wide-viewing angle LCDs that are able to satisfy the requirements listed above.

The FFS LCD has a transparent conductive pixel electrode and a transparent conductive common electrode. The distance between the pixel electrode and the common electrode is smaller than the cell gap between two substrates, and a fringe field effect is produced between the pixel electrode and the common electrode to drive the liquid crystals to rotate. When light passes through the liquid-crystal molecules in a horizontal arrangement, the FFS LCD can achieve a wide viewing angle display effect.

However, it is difficult for the FFS LCDs to provide a bright-state transmittance at different viewing angles.

BRIEF SUMMARY

The disclosure provides configurations of a pixel electrode and a common electrode of a display panel making a fringe field switching (FFS) display panel that meets the requirement of bright-state transmittance at every viewing angle. According to the display panel of the disclosure, disposing the edges of the pixel electrode in slits of the common electrode and adjusting the relationship of the distances between the edges of the pixel electrode, the edges of slits of the common electrode, and the edges of the data line, so that the bright-state transmittance, the dark-state transmittance, or the maintenance ratio of the viewing-angles of the display panel can be kept within the desired design range, and the display quality of the display panel is thereby improved.

According to some embodiments of the disclosure, a display panel is provided. The display panel includes a first substrate and a second substrate disposed opposite to the first substrate. A display medium layer is disposed between the first substrate and the second substrate. A first scan line, a second scan line adjacent to the first scan line, a first data line, and second data line adjacent to the first data line are all disposed on the first substrate. The first scan line, the second scan line, the first data line, and the second data line intersect to define a pixel area. The pixel area includes a pixel electrode disposed on the first substrate. A common electrode is disposed on the pixel electrode, and the common electrode corresponding to the pixel area includes a first slit and a second slit, wherein the first slit is near the first data line, and the first slit has a first edge closest to the first data line. The second slit is near the second data line, and the second slit has a second edge closest to the second data line. The pixel electrode has a third edge located in the first slit and a fourth edge located in the second slit. The first distance between the first edge and the third edge is different from the second distance between the second edge and the fourth edge.

According to some embodiments of the disclosure, an electronic device is provided. The electronic device includes the display panel described above and a touch sensor structure disposed on an inner side surface of the second substrate of the display panel facing the first substrate. The touch sensor structure may alternatively be disposed on the outer surface of the second substrate, opposite to the inner side surface.

According to some embodiments of the disclosure, a display panel is provided. The display panel includes a first substrate and a second substrate disposed opposite to the first substrate. A display medium layer is disposed between the first substrate and the second substrate. A first scan line and a second scan line adjacent to the first scan line are disposed on the first substrate. A common electrode line is adjacent to the first scan line or the second scan line. The common electrode line has an enlarged portion, and an extending direction of the common electrode line is substantially the same as an extending direction of the first scan line. A first data line and a second data line adjacent to the first data line are disposed on the first substrate. The first scan line, the second scan line, the first data line, and the second data line intersect to define a pixel area. The pixel area includes a pixel electrode disposed on the first substrate. A common electrode is disposed on the pixel electrode. An insulating layer is disposed between the pixel electrode and the common electrode. A contact hole is formed in the insulating layer, the common electrode line is electrically connected to the common electrode through the contact hole, and the enlarged portion overlaps the contact hole. In a direction perpendicular to the extending direction of the common electrode line, the enlarged portion has a maximum width, a part of the common electrode line overlapping the first data line has a maximum width, and the maximum width of the enlarged portion is greater than the maximum width of the first data line.

According to some embodiments of the disclosure, an electronic device is provided. The electronic device includes the display panel described above.

A detailed description is given in the following embodiments with reference to the accompanying drawings.

BRIEF DESCRIPTION OF THE DRAWINGS

The present disclosure can be more fully understood by reading the subsequent detailed description and examples with references made to the accompanying drawings, wherein.

DETAILED DESCRIPTION

Figure 1:
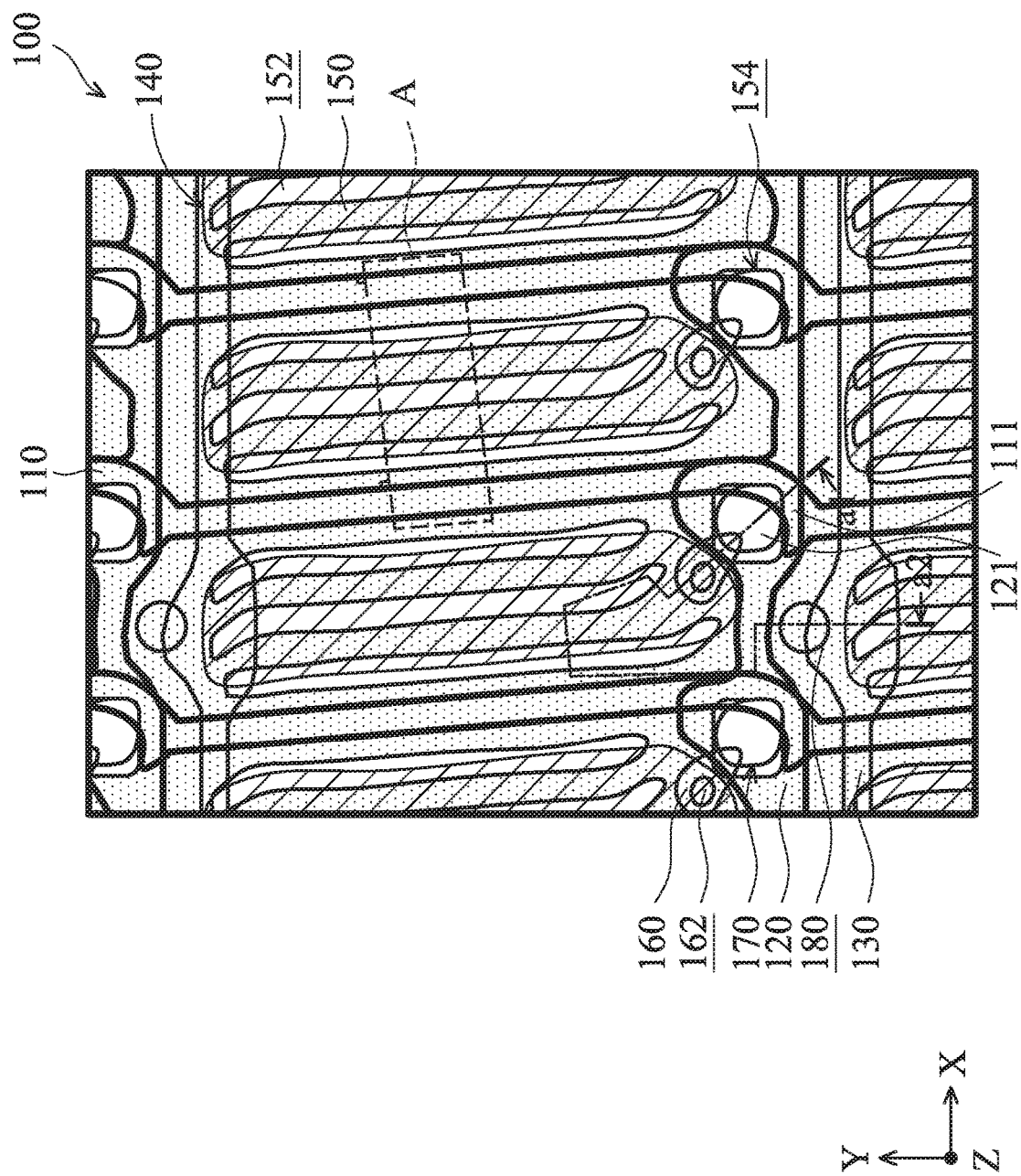
FIG. 1 shows a partial plane view of a display panel according to some embodiments of the disclosure.

FIG. 1 shows a partial plane view of a display panel 100 according to some embodiments of the disclosure. The display panel 100 includes a plurality of data lines 110. The data lines 110 may be in the form of a non-straight-line layout, such as a curved-line layout, but they have a substantially extending direction such as an extending direction similar to the extending direction of the Y-axis, and the data lines 110 are substantially parallel to one another. In addition, the display panel 100 also includes a plurality of scan lines 120. The scan lines 120 may be in the form of a straight-line layout or non-straight line layout, but have a substantially extending direction such as an extending direction similar to the extending direction of the X-axis, and the scan lines 120 are substantially parallel to one another.

The two adjacent data lines 110 and the two adjacent scan lines 120 intersect to define a pixel area. The display panel 100 has a plurality of pixel areas. The pixel area includes a pixel electrode 140 and a common electrode 150. In some embodiments, the display panel 100 is a fringe field switching (FFS) display panel, the pixel electrode 140 thereof in one pixel area is a section electrode covering a part of the pixel area, and the pixel electrodes 140 corresponding to different pixels are separated and electrically isolated from each other. The common electrode 150 in one pixel area has a plurality of slits 152. As shown in FIG. 1, in some embodiments, the common electrode 150 in one pixel area has three slits 152, and the common electrodes 150 corresponding to different pixel areas are continuous and connected with each other, but may with pattern in. According to some embodiments of the disclosure, the common electrode 150 is disposed over the pixel electrode 140, and the edges of the pixel electrode 140 are located in two slits 152 of the common electrode 150.

In addition, as shown in FIG. 1, there is a common electrode line 130 adjacent to scan line 120. The common electrode line 130 has a substantially extending direction that is the same as that of the scan line 120, such as an extending direction similar to the extending direction of the X-axis. The common electrode 150 is electrically connected to the common electrode line 130 through a contact hole 180. Moreover, a thin-film transistor (TFT) is disposed near the intersection of the scan line 120 and the data line 110. The TFT is used to control the pixel area and as a switching device electrically connecting with the data line 110.

The TFT includes a gate electrode 121 constructed from a part of the scan line 120, a source electrode 111 constructed from a part of the data line 110, a drain electrode 160 and an active layer 170 formed of semiconductor materials. As shown in FIG. 1, the pixel electrode 140 electrically connects the drain electrode 160 through a contact hole 162. In addition, the common electrode 150 has an opening 154 corresponding to the location of the TFT or a contact hole in order to prevent the common electrode 150 from producing electrical interference to the TFT.

Figure 2:
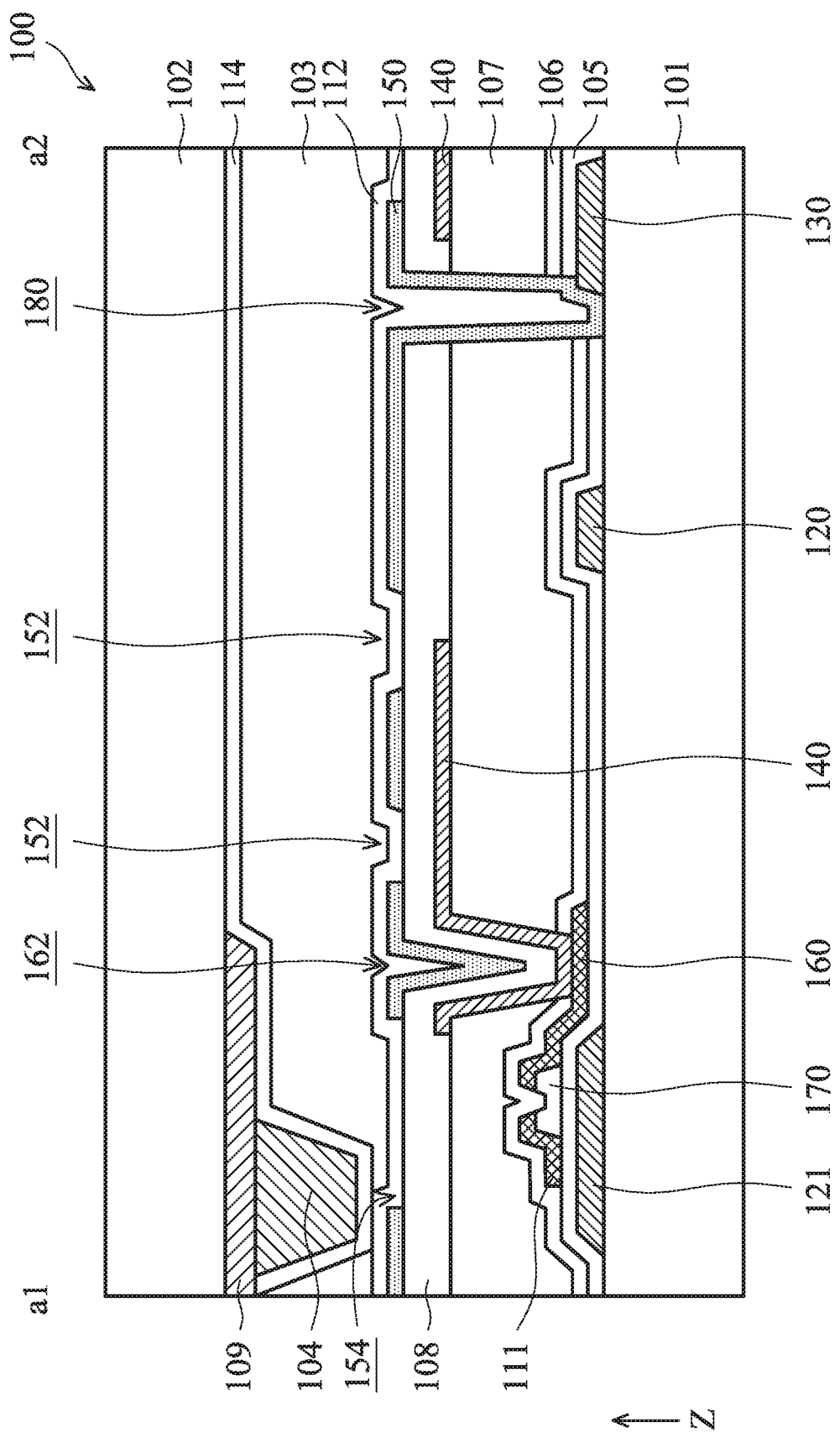
FIG. 2 shows a partial cross-sectional view of the display panel, along the cross-sectional line a1-a2 shown in FIG. 1, according to some embodiments of the disclosure.

FIG. 2 shows a partial cross-sectional view of the display panel 100, along the cross-sectional line a1-a2 shown in FIG. 1, according to some embodiments of the disclosure. As shown in FIG. 2, the scan line 120, the gate electrode 121 constructed from a part of the scan line 120 and the common electrode line 130 are formed on a first substrate 101. In some embodiments, the scan line 120, the gate electrode 121 and the common electrode line 130 may be formed by a deposition, lithography and etching process from the same conductive layer, such as a metal layer.

As shown in FIG. 2, a first insulating layer 105 is formed on the scan line 120, the gate electrode 121 and the common electrode line 130, and the first insulating layer 105 over the gate electrode 121 is used as a gate dielectric layer. The active layer 170 is formed on the first insulating layer 105. In some embodiments, the material of the active layer 170 may be amorphous silicon, LTPS, IGZO, not limited to. In the embodiments of FIG. 2, the TFT is a bottom-gate TFT, not limited to. The source electrode 111 and the drain electrode 160 of the TFT are formed on the active layer 170. In some embodiments, the data line 110, the source electrode 111 constructed from a part of the data line 110 and the drain electrode 160 are formed by a deposition, lithography and etching process from the same conductive layer, such as a metal layer.

As shown in FIG. 2, a second insulating layer 106 is formed on the source electrode 111 and the drain electrode 160 and located on the active layer 170 and the first insulating layer 105. In some embodiments, a third insulating layer 107 used as a planarization layer is formed on the second insulating layer 106 (in some other embodiments, the third insulating layer 107 may be omitted). The contact hole 162 is formed in the second insulating layer 106 and the third insulating layer 107. The pixel electrode 140 is formed on the third insulating layer 107 and formed in the contact hole 162. The pixel electrode 140 electrically connects the drain electrode 160 through the contact hole 162.

As shown in FIG. 2, a fourth insulating layer 108 is formed on the pixel electrode 140 and formed in the contact hole 162. In addition, the contact hole 180 is formed in the first insulating layer 105, second insulating layer 106, third insulating layer 107 and fourth insulating layer 108. The common electrode 150 is formed on the fourth insulating layer 108 and formed in the contact hole 180, so that the common electrode 150 electrically connects the common electrode line 130 through the contact hole 180. The common electrode 150 has the plurality of slits 152 in one pixel area and has an opening 154 corresponding to the location of the TFT to avoid the location of the channel area of the TFT.

In some embodiments, the pixel electrode 140 and the common electrode 150 are made of transparent conductive materials such as indium tin oxide (ITO), IZO, ITZO, IGZO or another suitable conductive material. The pixel electrode 140 or the common electrode 150 may be formed by using a deposition, lithography and etching process. In some embodiments, the materials of the first insulating layer 105, second insulating layer 106, third insulating layer 107 and fourth insulating layer 108 may be silicon oxide, silicon nitride, silicon oxynitride or inorganic insulating materials of the combinations thereof or another suitable insulating material, but they are not limited thereto, and the materials of the first insulating layer 105, second insulating layer 106, third insulating layer 107 and fourth insulating layer 108 may be the same or different from each other. In addition, the concentration ratio of the materials of the first insulating layer 105, second insulating layer 106, third insulating layer 107 and fourth insulating layer 108 may also be different from each other. For example, by adjusting the times of the process or the concentration of nitrogen or oxygen gases used to fabricate every insulating layer, the concentration ratio of the materials of every insulating layer is different from one another. In some embodiments, the third insulating layer 107 used as the planarization layer may be made of organic materials such as poly fluoro alkoxy (PFA) or color filter materials.

As shown in FIG. 2, the display panel 100 also has a second substrate 102 disposed opposite to the first substrate 101. In some embodiments, the first substrate 101 and the second substrate 102 are such as glass substrates, plastic substrates, flexible substrates or barrier films, but not limited to. A display medium layer 103 is sandwiched between the first substrate 101 and the second substrate 102. In some embodiments, the display medium layer 103 can be a liquid-crystal layer, and the second substrate 102 can be a color filter (CF) substrate, and the first substrate 101 is a TFT array substrate. In some other embodiments, a color filter layer may be disposed on the first substrate 101, for example, the third insulating layer 107 can be replaced by the materials of a color filter layer, or adding a color filter layer between the second insulating layer 106 and the fourth insulating layer 108. In addition, a spacer 104 such as a photo spacer is disposed between the first substrate 101 and the second substrate 102. The spacer 104 extends into the display medium layer 103, and the spacer 104 can support and determine a cell gap between the first substrate 101 and the second substrate 102. The spacer 104 can be disposed on the first substrate 101 or second substrate 102. Moreover, the spacer 104 can be a different height, depending on the design requirements. A black matrix (BM) 109 is disposed between the spacer 104 and the second substrate 102, and a first alignment layer 112 is formed on the common electrode 150 and the fourth insulating layer 108. A second alignment layer 114 is formed on the spacer 104, the black matrix 109 and second substrate 102. The display medium layer 103 is between the first alignment layer 112 and the second alignment layer 114. Furthermore, the display panel 100 also includes other elements not shown in FIG. 2, such as an upper polarizing plate and a lower polarizing plate, etc. In other embodiments, the black matrix 109 can be disposed on the first substrate 101, depending on the design requirements.

Figure 3:
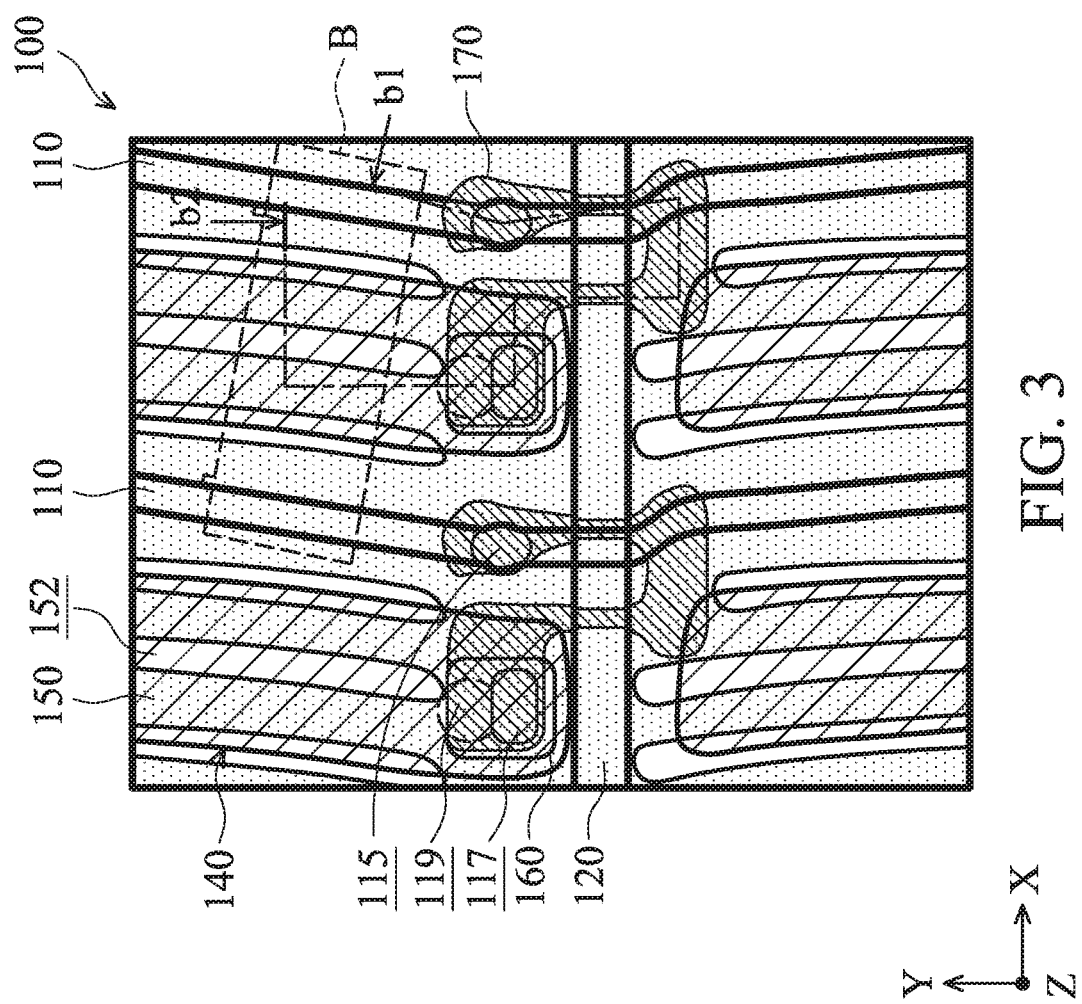
FIG. 3 shows a partial plane view of a display panel according to some other embodiments of the disclosure.

FIG. 3 shows a partial plane view of a display panel 100 according to some other embodiments of the disclosure. In the display panel 100 of FIG. 3, an active layer 170 of the TFT is made of low-temperature polysilicon (LTPS), and the TFT is a top-gate TFT of dual gates. According to some embodiments of the disclosure, the display panel 100 of FIG. 3 is a fringe field switching (FFS) liquid-crystal display panel. A common electrode 150 is disposed over a pixel electrode 140, and two edges of the pixel electrode 140 near the data lines 110 are located in two slits 152 of the common electrode 150. In the display panel 100 of FIG. 3, no common electrode line is disposed adjacent to a scan line 120.

Figure 4:
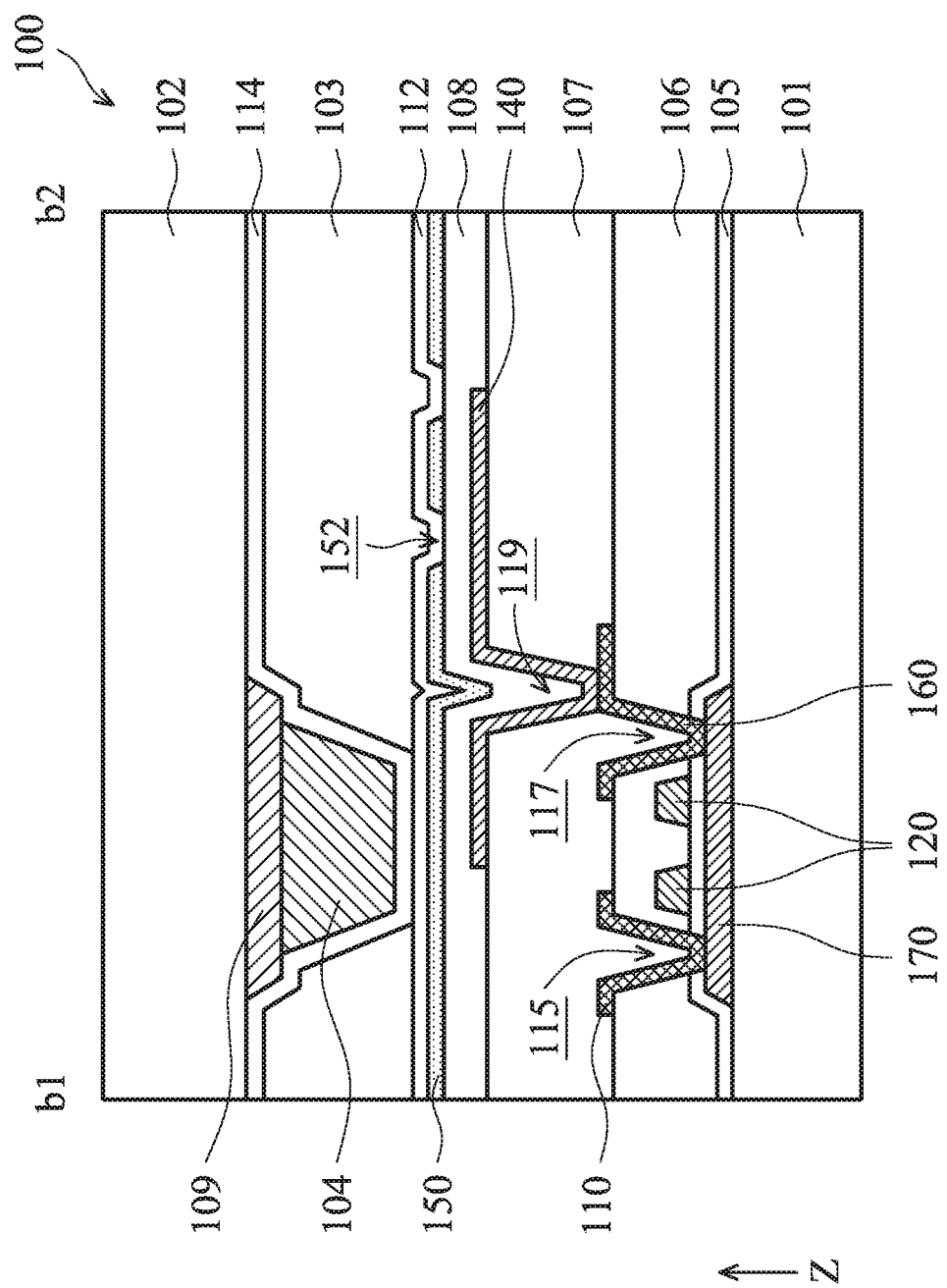
FIG. 4 shows a partial cross-sectional view of the display panel, along the cross-sectional line b1-b2 shown in FIG. 3, according to some embodiments of the disclosure.

FIG. 4 shows a partial cross-sectional view of the display panel 100, along the cross-sectional line b1-b2 shown in FIG. 3, according to some embodiments of the disclosure. As shown in FIG. 4, the active layer 170 is formed on the first substrate 101, the first insulating layer 105 is formed on the active layer 170 to be an insulating dielectric layer between the active layer 170 and gates. A dual gate electrode constructed from a part of the scan line 120 is formed on a first insulating layer 105, and the second insulating layer 106 is formed on the dual gate electrode. As shown in FIG. 4, a channel area produced by the overlap region between the dual gate electrode and the active layer 170. The dual gate electrode constructed from a part of the scan line 120 is located over the active layer 170, therefore, this TFT is called the top-gate TFT. In addition, contact holes 115 and 117 are formed in the first insulating layer 105 and a second insulating layer 106. A source electrode constructed from a part of the data line 110 is formed on the second insulating layer 106 and formed in the contact hole 115 to electrically connect the active layer 170. The drain electrode 160 of the TFT is also formed on the second insulating layer 106 and formed in the contact hole 117 to electrically connect the active layer 170.

As shown in FIG. 4, a third insulating layer 107 is formed on the second insulating layer 106 and covers the TFT. A contact hole 119 is formed in the third insulating layer 107 and to expose a part of a drain electrode 160. The pixel electrode 140 is formed on the third insulating layer 107 and formed in the contact hole 119, so that the pixel electrode 140 is electrically connected to the drain electrode 160 through the contact hole 119.

As shown in FIG. 4, a fourth insulating layer 108 is formed on the pixel electrode 140 and formed in the contact hole 119. The common electrode 150 is formed on the fourth insulating layer 108 and formed in the contact hole 119. The common electrode 150 has a plurality of slits 152 in one pixel area. In addition, the display panel 100 has a second substrate 102 disposed opposite to the first substrate 101. A display medium layer 103, such as a liquid-crystal layer, is disposed between the first substrate 101 and the second substrate 102. A spacer 104 is disposed on the first substrate 101 or the second substrate 102. Moreover, the spacer can be a different height, depending on the design. A black matrix (BM) 109 is disposed between the spacer 104 and the second substrate 102, and a first alignment layer 112 is formed on the common electrode 150 and the fourth insulating layer 108. A second alignment layer 114 is formed on the spacer 104, the black matrix 109 and second substrate 102. The display medium layer 103 is between the first alignment layer 112 and the second alignment layer 114. Furthermore, the display panel 100 also includes other elements not shown in FIG. 4, such as an upper polarizing plate, or a lower polarizing plate, etc.

Figure 5A:
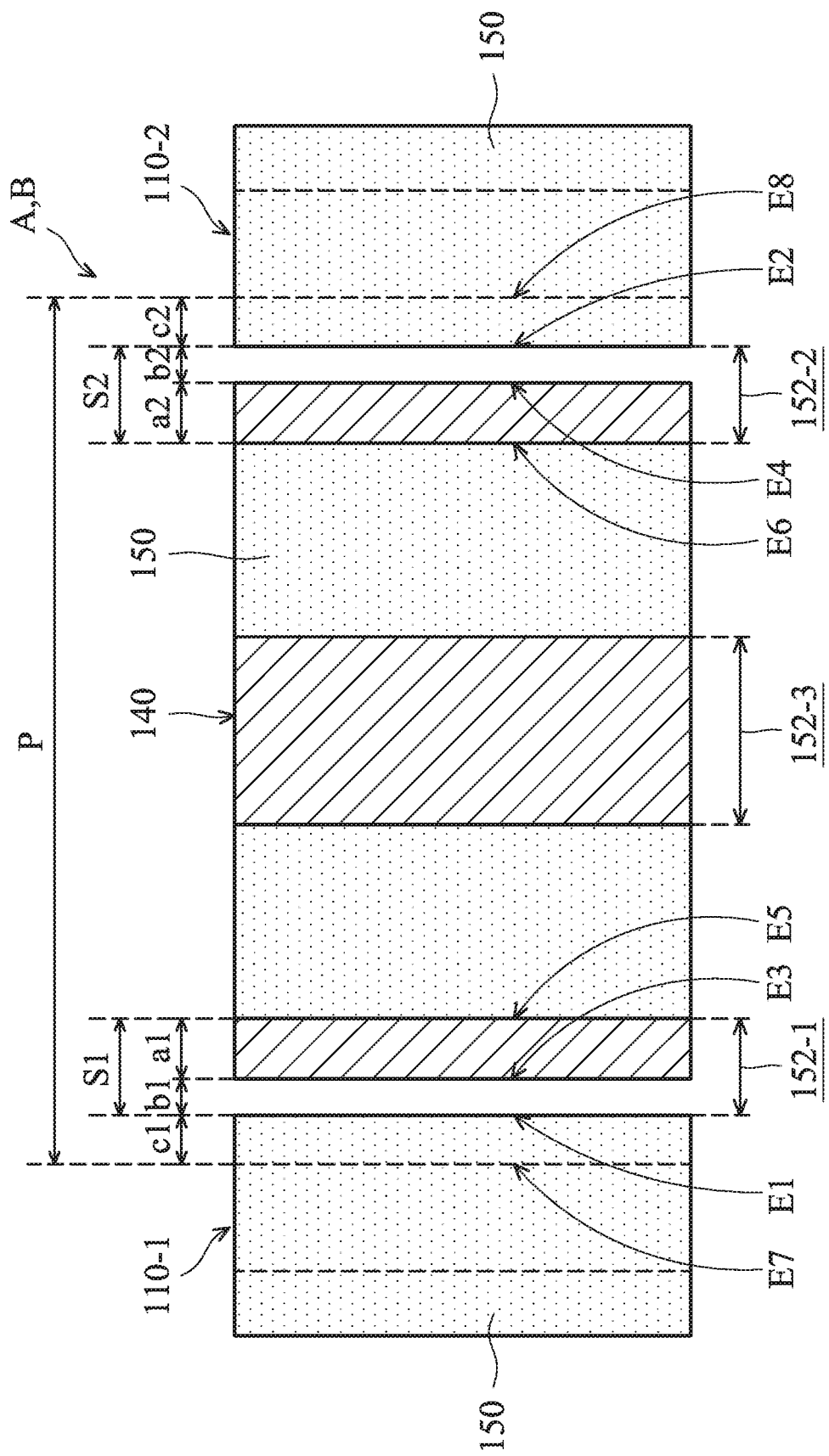
FIG. 5A shows an enlarged plane view of area A of the display panel shown in FIG. 1 and area B of the display panel shown in FIG. 3, according to some embodiments of the disclosure.

FIG. 5A shows an enlarged plane view of area A of the display panel 100 shown in FIG. 1 and area B of the display panel 100 shown in FIG. 3 according to some embodiments of the disclosure. The rectangle area A and the rectangle area B are obtained by making the long side of the rectangle perpendicular to the extending direction of two adjacent data lines 110 in one pixel area. Therefore, various distances in FIG. 5A are also decided by the direction substantially perpendicular to the extending direction of the data lines 110.

Figure 5B:
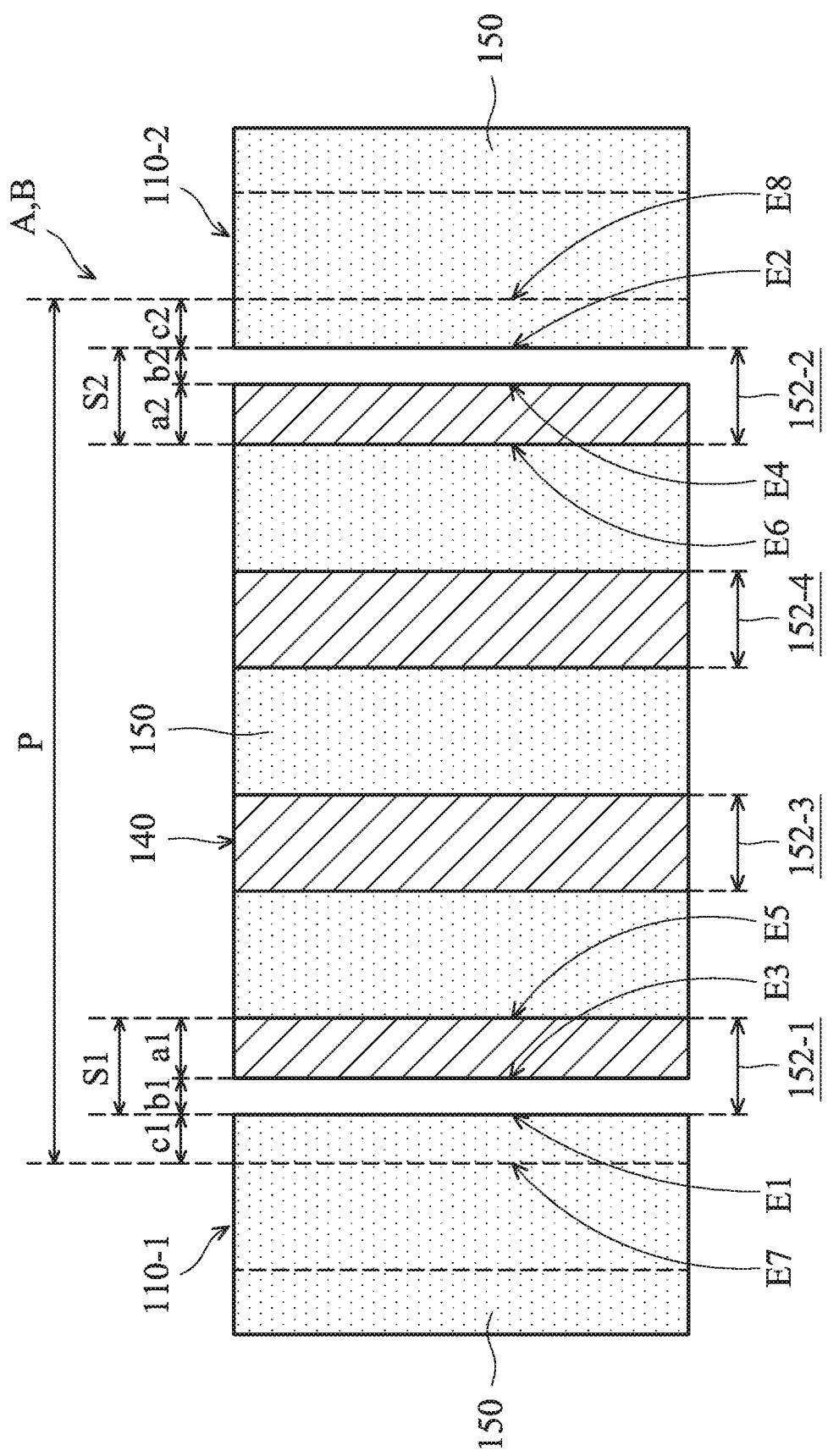
FIG. 5B shows an enlarged plane view of area A of the display panel shown in FIG. 1 and area B of the display panel shown in FIG. 3 according to some other embodiments of the disclosure.

Referring to FIG. 5A, a pixel area P is between a first data line 110-1 and a second data line 110-2. In some embodiments, the common electrode 150 shown in FIGS. 1 and 3 corresponding to one pixel area P has three slits 152-1 to 152-3. In some other embodiments, as shown in FIG. 5B, the common electrode 150 corresponding to one pixel area P has four slits 152-1 to 152-4. As shown in FIGS. 5A and 5B, the common electrode 150 corresponding to one pixel area P at least includes a first slit 152-1 near the first data line 110-1 and a second slit 152-2 near the second data line 110-2. As shown in FIGS. 5A and 5B, the first slit 152-1 has a first edge E1 that is closest to the first data line 110-1 and a fifth edge E5 that is far from the first data line 110-1, the first edge E1 and the fifth edge E5 are the section edge of the first slit 152-1 that are approximately and substantially parallel to the extending direction of the first slit 152-1. The second slit 152-2 has a second edge E2 that is closest to the second data line 110-2 and a sixth edge E6 that is far from the second data line 110-2, the second edge E2 and the sixth edge E6 are the section edge of the second slit 152-2 approximately and substantially parallel to the extending direction of the second slit 152-2.

According to some embodiments of the disclosure, in one pixel area P, the pixel electrode 140 has a third edge E3 located in the first slit 152-1, and the third edge E3 is the section edge of the pixel electrode 140 that is approximately and substantially parallel to the extending direction of the first slit 152-1. The pixel electrode 140 also has a fourth edge E4 located in the second slit 152-2, and the fourth edge E4 is the section edge of the pixel electrode 140 that is approximately and substantially parallel to the extending direction of the second slit 152-2. According to the disclosure embodiment the third edge E3 of the pixel electrode 140 is located inside the slit of the common electrode 150, it means that the third edge E3 of the pixel electrode 140 is not aligned with or not be completely overlapped with the two outer and inner edges E1 and E5 of the slit of the common electrode 150. This is because when the third edge E3 of the pixel electrode 140 is aligned with or completely overlapped with the inner edge E5 of the slit of the common electrode 150, the fringe field produced between the pixel electrode 140 and the common electrode 150 drive the liquid-crystal with poor efficiency. In this case, bright-state transmittance or maintenance ratio of viewing-angles of the display panel are not good. When the third edge E3 of the pixel electrode 140 is aligned with the outer edge E1 of the slit of the common electrode 150, the maintenance ratio of viewing angles of the display panel is worse. The disposition location of the edge E4 of the pixel electrode 140 is the same as the situations described above.

The maintenance ratio of viewing angles described above is defined by the ratio of the brightness of a display panel with an angle θ of 45 degrees and an angle Φ of 45 degrees to the brightness of a display panel with an angle θ 45 degrees and an angle Φ 0 degrees. The angle θ is the angle between the line of observation sight and a direction that is perpendicular to the plane of the substrate of the display panel (for example: the angle between the line of observation sight and the Z-axis). The angle Φ is the angle between the line of observation sight and the substantially extending direction of the scan line of the display panel (for example: the angle between the line of observation sight and the X-axis). In this embodiment, when the angle θ is 45 degrees and the angle Φ is 45 degrees, the angle between the viewing angle and the absorption axis of the polarizing plate of the display panel is 45 degrees. When the angle θ is 45 degrees and the angle Φ is 0 degrees, the angle between the viewing angle and the absorption axis of the polarizing plate of the display panel is 0 degrees. The brightness of the display panel can be measured by using light intensity instruments, such as model number CA210, CS 1000 or CS 2000. When the maintenance ratio of viewing angles is higher, this indicates that the display panel can maintain the desired brightness more evenly at various viewing angles and have a better-quality display.

Referring to FIGS. 5A and 5B, the common electrode 150 has the first slit 152-1 that is closer to the first data line 110-1. The first slit 152-1 has the fifth edge E5 that is further away from the first data line 110-1 and opposite to the first edge E1. The distance between the fifth edge E5 and the third edge E3 of the pixel electrode 140 is a fifth distance a1, and the first slit 152-1 has a first width S1. Similarly, the common electrode 150 has the second slit 152-2 that is closer to the second data line 110-2. The second slit 152-2 has a sixth edge E6 that is further away from the second data line 110-2 and opposite to the second edge E2. The distance between the sixth edge E6 and the fourth edge E4 of the pixel electrode 140 is the sixth distance a2, and the second slit 152-2 has a second width S2.

Referring to FIGS. 5A and 5B, the distance between the first edge E1 of the first slit 152-1 and the closest edge E7 of the first data line 110-1 is a third distance c1. Similarly, the distance between the second edge E2 of the second slit 152-2 and the closest edge E8 of the second data line 110-2 is the fourth distance c2.

Figure 6:
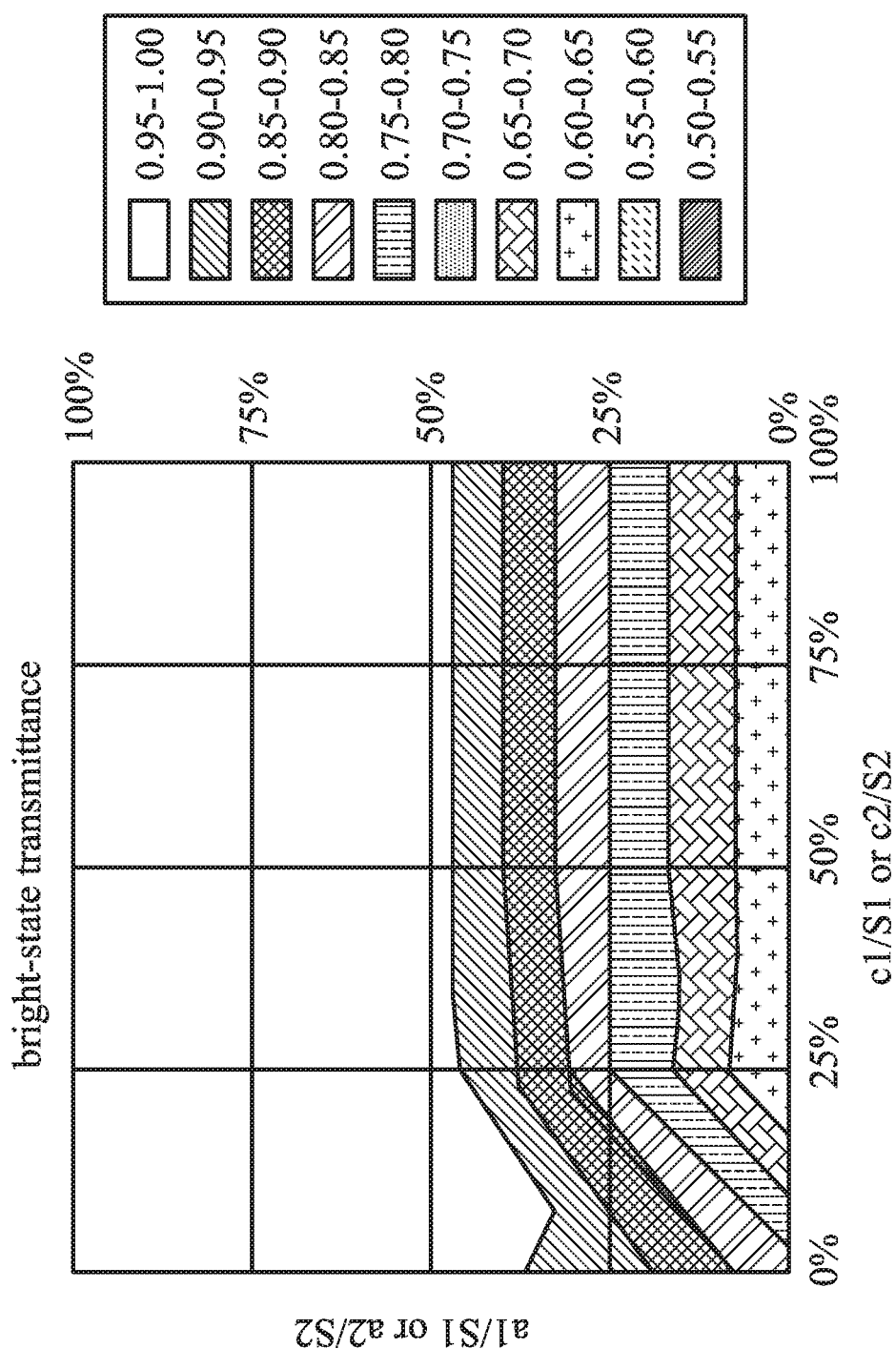
FIG. 6 shows a contour map of the bright-state transmittance of a display panel, a first ratio parameter, and a second ratio parameter, according to some embodiments of the disclosure.
Figure 7:
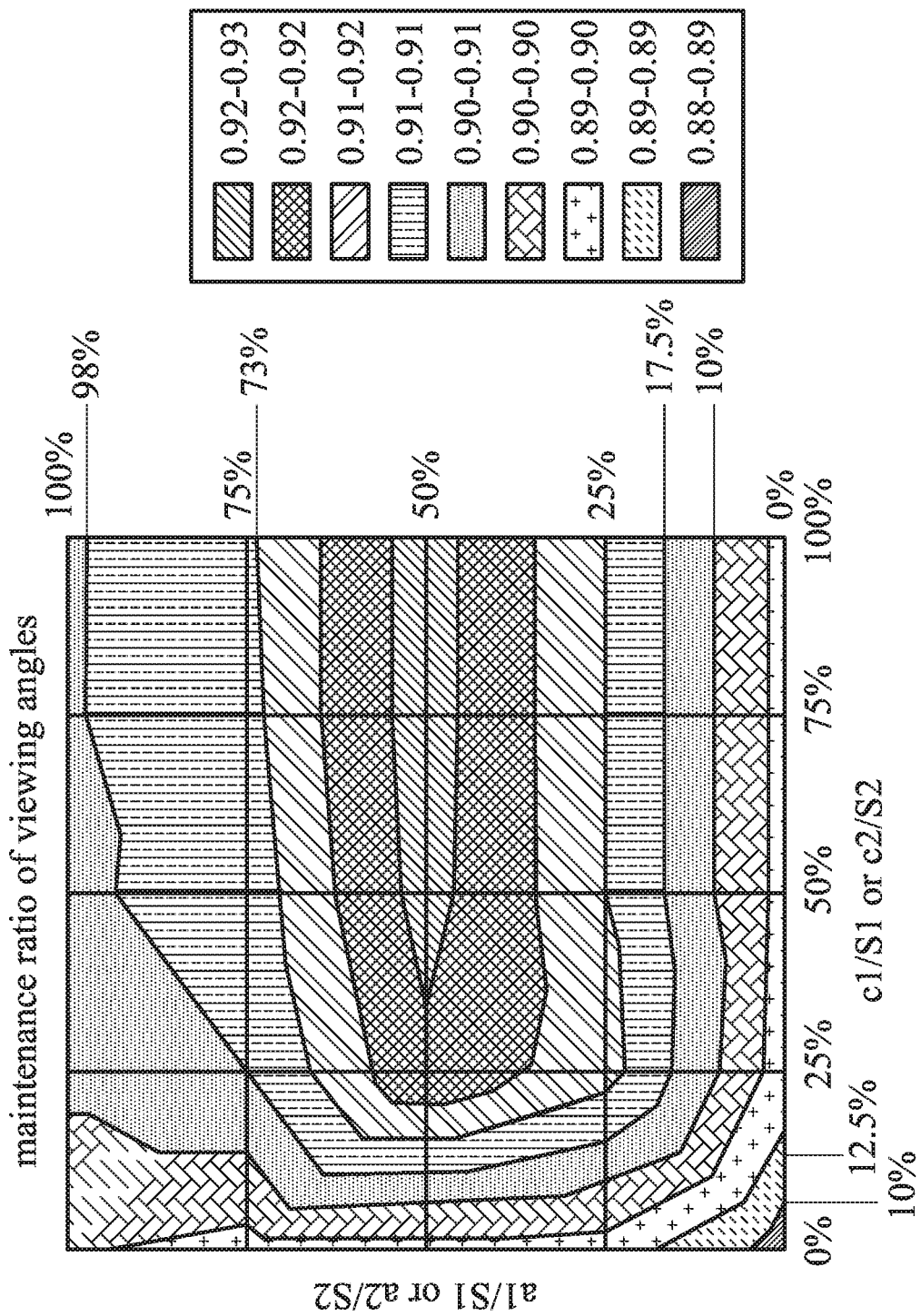
FIG. 7 shows a contour map of the maintenance ratio of viewing angles of a display panel, a first ratio parameter, and a second ratio parameter, according to some embodiments of the disclosure.

Referring to FIGS. 6 and 7 at the same time, FIG. 6 shows a contour map of the bright-state transmittance of the display panel 100, a first ratio parameter on the vertical axis, and a second ratio parameter on the horizontal axis, according to some embodiments of the disclosure. The first ratio parameter (a1/S1 or a2/S2) is a percentage of the fifth distance a1 divided by the first width S1, or a percentage of the sixth distance a2 divided by the second width S2. In the embodiments of the disclosure, the two kinds of first ratio parameters described above are not limited to be set up at the same time or to be the same, and the two kinds of first ratio parameters can respectively be designed with different values, depending on the design. Namely, the two kinds of first ratio parameters described above can be the same or different. The second ratio parameter (c1/S1 or c2/S2) is a percentage of the third distance c1 divided by the first width S1 or a percentage of the fourth distance c2 divided by the second width S2. In the embodiments of the disclosure, the two kinds of second ratio parameters described above are not limited to being set up at the same time, or to being the same, and the two kinds of second ratio parameters can respectively be designed to have different values, depending on the design. Namely, the two kinds of second ratio parameters described above can be the same or different. FIG. 7 shows a contour map of the maintenance ratio of viewing-angles of the display panel 100, the first ratio parameter on the vertical axis and the second ratio parameter on the horizontal axis, according to some embodiments of the disclosure. The first ratio parameter and the second ratio parameter described above can respectively be designed to have different values, depending on demand, or be designed to cooperate with each other, which are not limited herein.

As shown in FIGS. 6 and 7, when the first ratio parameter (a1/S1 or a2/S2) is equal to 0%, the bright-state transmittance and the maintenance ratio of viewing-angles are both worse. When the first ratio parameter (a1/S1 or a2/S2) is equal to 100%, the maintenance ratio of viewing-angles is worse. Therefore, according to the embodiments of the disclosure, the first ratio parameter (a1/S1 or a2/S2) does not equal 0% and does not equal 100%. For example, neither a1 nor a2 is equal to 0; a1 is not equal to S1; or a2 is not equal to S2. In other words, the third edge E3 or the fourth edge E4 of the pixel electrode 140 is respectively located in the first slit 152-1 and the second slit 152-2 of the common electrode 150 and does not overlap with the section edges of the first slit 152-1 and the second slit 152-2 that are approximately and substantially parallel to the extending direction of the slits. This design values described above can give the display panel 100 a better bright-state transmittance and a better maintenance ratio of viewing-angles.

In addition, referring to FIG. 7, in some embodiments of the disclosure, when the percentage (c1/S1) of the third distance c1 divided by the first width S1 is greater than 10% and smaller than 100% (not equal to 100%), the maintenance ratio of viewing angles of the display panel can be greater than 0.90. In another embodiment, when the percentage (c2/S2) of the fourth distance c2 divided by the second width S2 is greater than 10% and smaller than 100% (not equal to 100%), the maintenance ratio of viewing angles of the display panel can be greater than 0.90.

Referring to FIG. 7, in some other embodiments of the disclosure, when the percentage (c1/S1) of the third distance c1 divided by the first width S1 is greater than 12.5% and smaller than 100% (not equal to 100%), the maintenance ratio of viewing angles of the display panel can be greater than 0.91. In another embodiment, when the percentage (c2/S2) of the fourth distance c2 divided by the second width S2 is greater than 12.5% and smaller than 100% (not equal to 100%), the maintenance ratio of viewing angles of the display panel can be greater than 0.91.

Therefore, the percentage (c1/S1) of the third distance c1 divided by the first width S1 or the percentage (c2/S2) of the fourth distance c2 divided by the second width S2 can be chosen according to the demands of the maintenance ratio of viewing angles of the display panel.

Referring to FIG. 7, in some other embodiments of the disclosure, the percentage (a1/S1) of the fifth distance a1 divided by the first width S1 can be between 17.5% and 98%. Similarly, the percentage (a2/S2) of the sixth distance a2 divided by the second width S2 can be between 17.5% and 98%. This is because, when the percentage of a1/S1 and a2/S2 is between 17.5% and 98%, the maintenance ratio of viewing angles of the display panel can be greater than 0.91, and a better-quality display may be obtained.

Referring to FIGS. 5A and 5B, the distance between the first edge E1 and the third edge E3 is defined as a first distance b1, and the distance between the second edge E2 and the fourth edge E4 is defined as a second distance b2. According to some embodiments of the disclosure, the first distance b1 is not equal to the second distance b2. In another embodiment, the difference between the first distance b1 and the second distance b2 is between 0.5 µm and 20 µm. In another embodiment, the difference between the first distance b1 and the second distance b2 is between 0.5 µm and 10 µm. In another embodiment, the difference between the first distance b1 and the second distance b2 is between 0.5 µm and 5 µm. In this way, when the process of fabricating the display panel has slight variance and causes the elements of the display panel to shift, the bright-state transmittance of the display panel is still in a stable range without rapid change, and the display quality of the display panel is thereby maintained.

Referring to FIGS. 5A and 5B, the first slit 152-1 of the common electrode 150 has a first width S1. The distance between the first edge E1 of the first slit 152-1 and the closest edge E7 of the first data line 110-1 is the third distance c1. The edge E7 of the first data line 110-1 is the section edge that is approximately and substantially parallel to the extending direction of the first slit 152-1. The first shift amount (M-shift 1) is defined by the third distance c1 subtracted from half of the first width S1 and then divided by the first width S1, i.e. the first shift amount (M-shift 1)=((S1/2)−c1)/S1. Similarly, the second slit 152-2 of the common electrode 150 has a second width S1. The distance between the second edge E2 of the second slit 152-2 and the closest edge E8 of the second data line 110-2 is the fourth distance c2. The edge E8 of the second data line 110-2 is the section edge that is approximately and substantially parallel to the extending direction of the second slit 152-2. The second shift amount (M-shift 2) is defined by the fourth distance c2 subtracted from half of the second width S2 and then divided by the second width S2, i.e. the second shift amount (M-shift 2)=((S2/2)−c2)/S2.

Referring to FIGS. 5A and 5B, the first slit 152-1 of the common electrode 150 has a first width S1. The third shift amount (P-shift 3) is defined by the fifth distance a1 defined above, subtracted from half of the first width S1, and then divided by the first width S1, i.e. the third shift amount (P-shift 3)=((S1/2)−a1)/S1. In another embodiment, the second slit 152-2 of the common electrode 150 has a second width S1. The fourth shift amount (P-shift 4) is defined by the sixth distance a2 defined above, subtracted from half of the second width S2, and then divided by the second width S2, i.e. the fourth shift amount (P-shift 4)=((S1/2)−a2)/S2.

Figure 8:
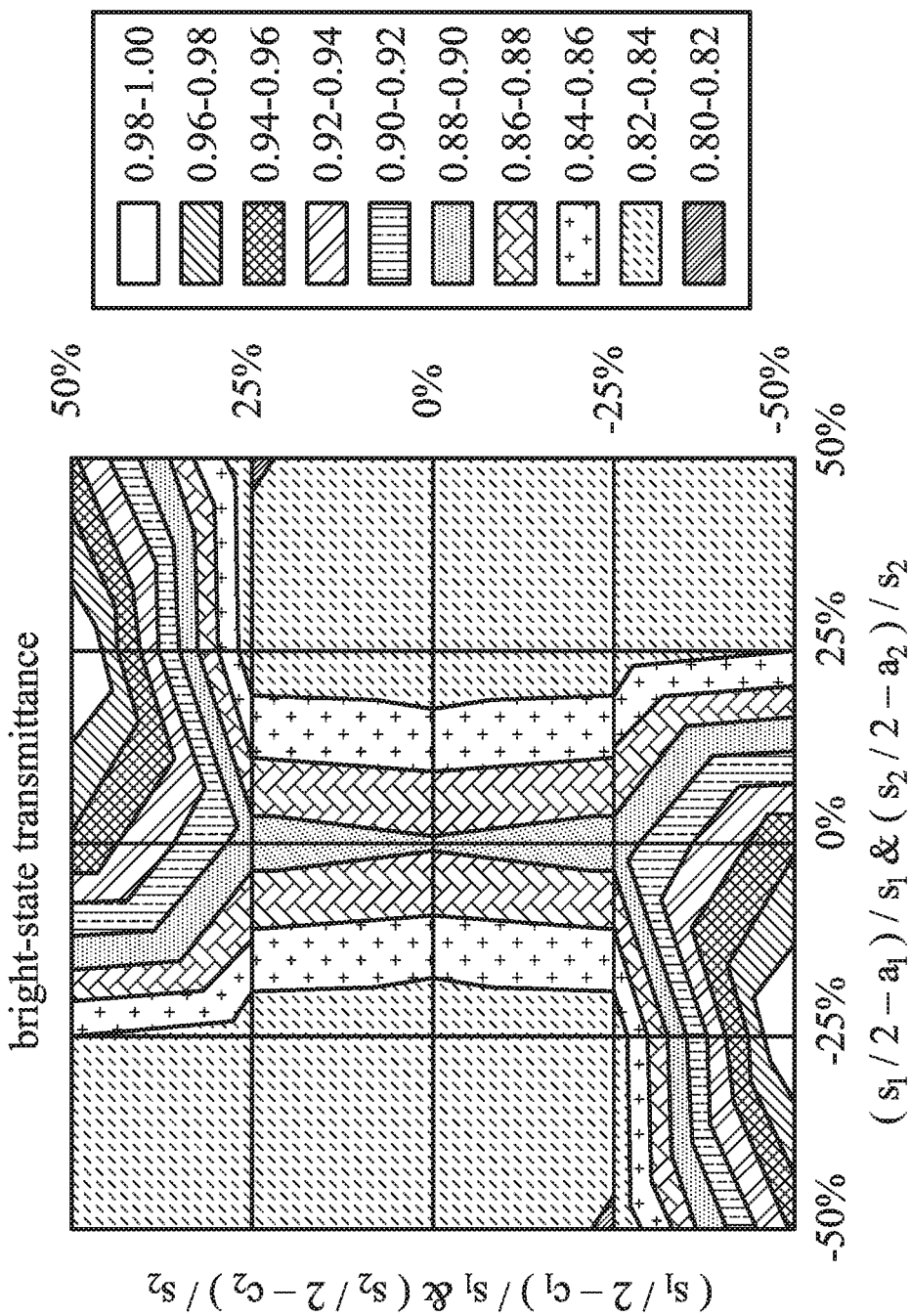
FIG. 8 shows a contour map of the bright-state transmittance of a display panel, a first shift parameter, and a second shift parameter, according to some embodiments of the disclosure.

FIG. 8 shows a contour map of the bright-state transmittance of the display panel 100, a first shift parameter on the vertical axis and a second shift parameter on the horizontal axis, according to some embodiments of the disclosure. The first shift parameter is a percentage of the first shift amount (M-shift 1)=((S1/2)−c1)/S1 or the second shift amount (M-shift 2)=((S2/2)−c2)/S2. The second shift parameter is a percentage of the third shift amount (P-shift 3)=((S1/2)−a1)/S1 or the fourth shift amount (P-shift 4)=((S2/2)−a2)/S2.

As shown in FIG. 8, when the second shift parameter (P-shift 3 or P-shift 4) is equal to 0%, i.e. S1/2 is equal to a1 or S2/2 is equal to a2, and the bright-state transmittance of the display panel would be at the peak of the contour line. When the process of fabricating the display panel has slight variance, the bright-state transmittance would have rapid change. Therefore, it is better to choose the second shift parameter (P-shift 3 or P-shift 4) not equal to 0%, i.e. cause the third edge E3 or the fourth edge E4 of the pixel electrode 140 not to be located at the central position of the first slit 152-1 and second slit 152-2 of the common electrode 150, respectively; and cause the first distance b1 shown in FIGS. 5A and 5B not to be equal to the second distance b2. In this way, the display panel 100 obtains a better production yield.

According to some embodiments of the disclosure, the third shift amount (P-shift 3) or the fourth shift amount (P-shift 4) is not equal to 0% and is not equal to +50% or −50% (not equal to +/−50%). This is because when the third shift amount (P-shift 3) or the four shift amount (P-shift 4) is equal to 0%, i.e. when the edge of the pixel electrode 140 is located in the central position of the first slit 152-1 or the second slit 152-2 of the common electrode 150, the bright-state transmittance of the display panel would have a rapid change while the process of fabricating the display panel has a slight variance to cause the elements of the display panel to shift. Therefore, the third shift amount (P-shift 3) or the fourth shift amount (P-shift 4) is not equal to 0%.

In addition, when the third shift amount (P-shift 3) or the fourth shift amount (P-shift 4) is equal to +/−50%, it indicates that the edge of the pixel electrode 140 is aligned with the inner side or outer section edge of the first slit 152-1 or the second slit 152-2 of the common electrode 150. In this way, the bright-state transmittance and the maintenance ratio of viewing-angles of the display panel are both not good. Therefore, the third shift amount (P-shift 3) or the fourth shift amount (P-shift 4) is not equal to +1-50%, and the display panel can have a better-quality display.

Referring to FIG. 8, in some embodiments of the disclosure, the first shift amount (M-shift 1) of the vertical axis may be between +25% and −25%, or the second shift amount (M-shift 2) may be between +25% and −25%, so that the bright-state transmittance of the display panel can be maintained in a flat area with small degree of variability. In this way, when the process of fabricating the display panel has a variance, the bright-state transmittance of the display panel would still maintain in a required range. This is because the polarity of the left data line is usually different from that of the right data line in one pixel area, and the left and right data lines have different coupling with the pixel, which may easily cause cross-talk. When the first shift amount (M-shift 1) or the second shift amount (M-shift 2) described above is controlled between 25% and −25%, the difference in the extent of the bright-state transmittance of the display panel is more relaxed, and the display quality of the display panel is thereby maintained. All of the design values described above can be mixed and matched with each other depending on the design, which is not limited herein.

Figure 9:
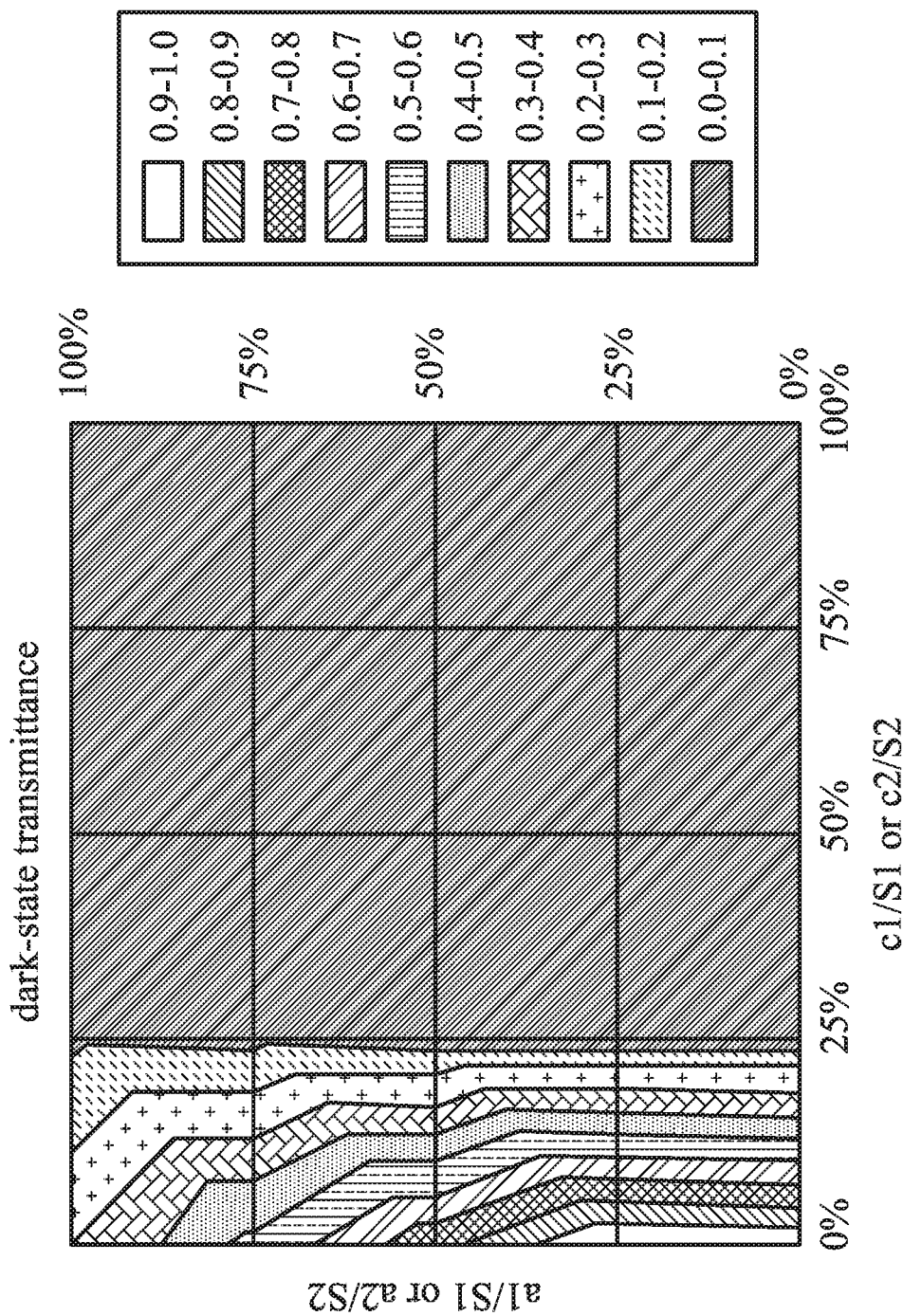
FIG. 9 shows a contour map of the dark-state transmittance of a display panel, a first ratio parameter, and a second ratio parameter, according to some embodiments of the disclosure.

Referring to FIG. 9, FIG. 9 shows a contour map of the dark-state transmittance of the display panel 100, a first ratio parameter (a1/S1 or a2/S2) on the vertical axis, and a second ratio parameter (c1/S1 or c2/S2) on the horizontal axis, according to some embodiments of the disclosure. The dark-state transmittance is better when it is lower. As shown in FIG. 9, when the second ratio parameter (c1/S1 or c2/S2) is closer to 0%, i.e. when the first slit 152-1 or the second slit 152-2 of the common electrode 150 are respectively closer to the first data line 110-1 or the second data line 110-2, the dark-state transmittance would change rapidly, and the display panel would easily have a light-leakage problem. A more stable transmittance change is required in the display panel to reduce the effects of process variance. Therefore, the second ratio parameter (c1/S1 or c2/S2) is greater than 25% and smaller than 100% (not equal to 100%), so that the display panel 100 can have a better-quality display.

Referring to FIG. 9, in some other embodiments of the disclosure, when the percentage (c1/S1) of the third distance c1 divided by the first width S1 is greater than 25% and smaller than 100% (not equal to 100%), the dark-state transmittance of the display panel can be between 0.0 and 0.1. Similarly, when the percentage (c2/S2) of the fourth distance c2 divided by the second width S2 is greater than 25% and smaller than 100% (not equal to 100%), the dark-state transmittance of the display panel can be between 0.0 and 0.1. In this way, the display panel has good display quality and does not have a problem with light leakage. This is because when the first edge E1 of the first slit 152-1 of the common electrode 150 is closer to the first data line 110-1 or the second edge E2 of the second slit 152-2 is closer to the second data line 110-2, the percentage of c1/S1 or c2/S2 is closer to 0%. In this way, the brightness of the display panel would have a rapid change, so that the cross-talk phenomenon between adjacent pixels can easily be seen, which causes poor display quality. Therefore, the percentage of c1/S1 or c2/S2 is controlled to be greater than 25% to obtain a lower dark-state transmittance.

Figure 10A:
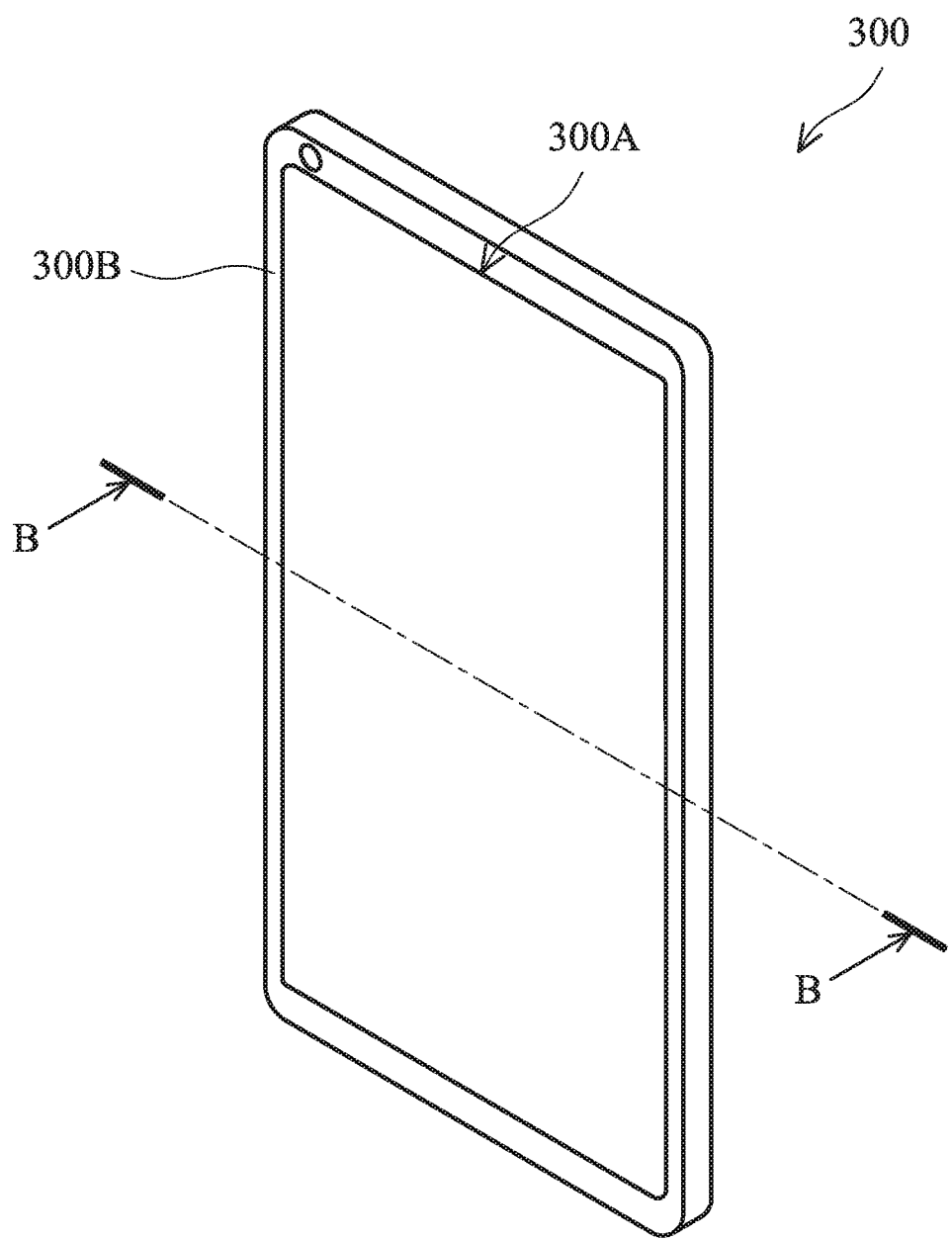
FIG. 10A shows a perspective view of an electronic device according to some embodiments of the disclosure.

FIG. 10A shows a perspective view of an electronic device 300 according to some embodiments of the disclosure. In some embodiments, the electronic device 300 is an electronic product having the functions of touch sensing and image display, such as a cell phone, tablet computer, tachograph computer, audio/video equipment, curved display, flexible display, foldable display, etc. As shown in FIG. 10A, the electronic device 300 has an active area 300A and a peripheral area 300B located outside of the active area 300A. The function of touch sensing and image display can be performed in the active area 300A, and the frame of the electronic device 300 is located at the peripheral area 300B. In one embodiment, the peripheral area 300B can only be disposed on the three outer sides of the active area 300A without surrounding the active area 300A.

Figure 10B:
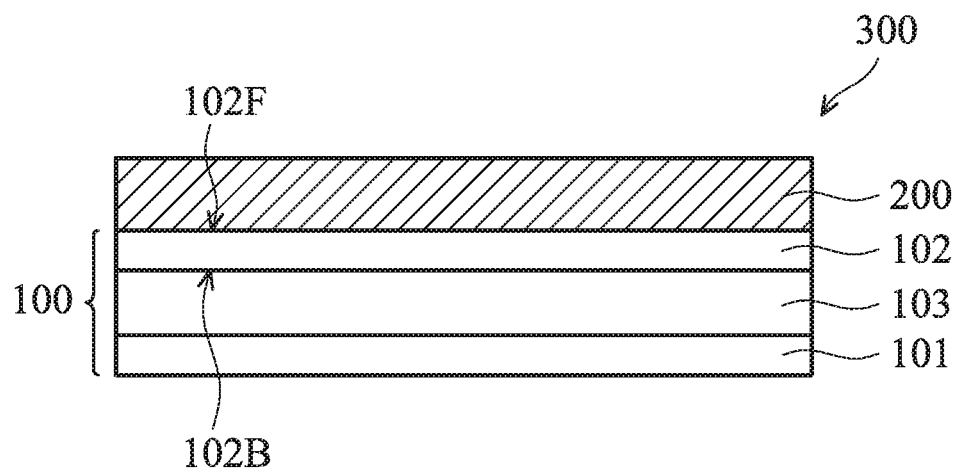
FIG. 10B shows a cross-sectional view of the electronic device, along the cross-sectional line B-B shown in FIG. 10A, according to some embodiments of the disclosure.

FIG. 10B shows a cross-sectional view of the electronic device 300, along the cross-sectional line B-B shown in FIG. 10A, according to some embodiments of the disclosure. As shown in FIG. 10B, the electronic device 300 includes a display panel 100 and a touch sensor structure 200 disposed on the outer side of a second substrate 102 of the display panel 100. In one embodiment, the touch sensor structure 200 (On-cell Touch) is disposed on an outer side surface 102F of the second substrate 102 of the display panel 100, and an inner side surface 102B of the second substrate 102 facing the display medium layer 103 of the display panel 100. In one embodiment, the touch sensor structure 200 also includes a protective layer (not shown) disposed on the outer side of the second substrate 102 that is far away from the display medium layer 103, and the touch sensor structure 200 is disposed between the second substrate 102 and the protective layer (not shown). In one embodiment, the touch sensor structure 200 can be an Out-cell Touch, which is bonded with the display panel 100 by adhesion.

Figure 10C:
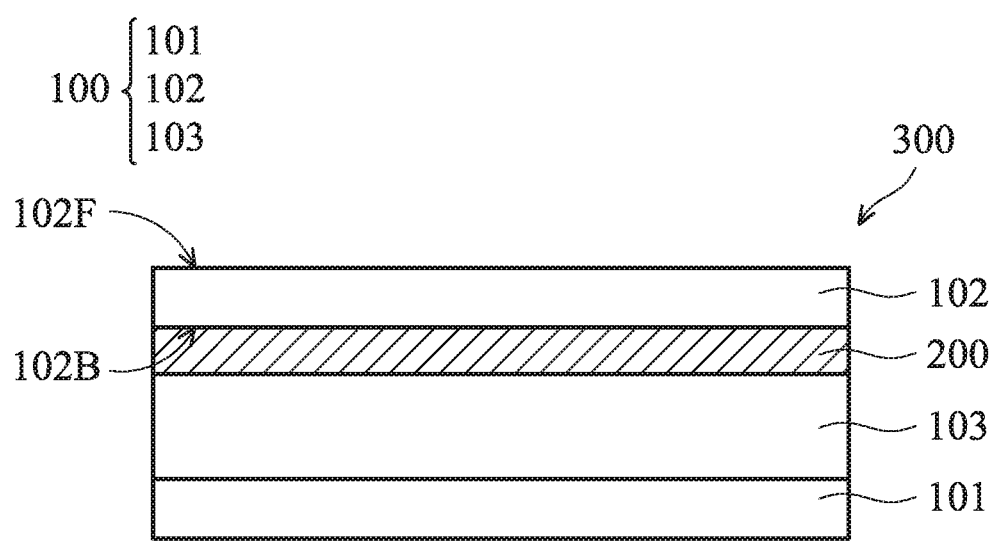
FIG. 10C shows a cross-sectional view of the electronic device, along the cross-sectional line B-B shown in FIG. 10A, according to some other embodiments of the disclosure.

FIG. 10C shows a cross-sectional view of the electronic device 300, along the cross-sectional line B-B shown in FIG. 10A, according to some other embodiments of the disclosure. As shown in FIG. 10C, the electronic device 300 includes a display panel 100 and a touch sensor structure 200 disposed on an inner side surface 102B of a second substrate 102 facing a first substrate 101 of the display panel 100. In the embodiment, the touch sensor structure 200 is an In-cell Touch disposed in the display panel 100. In another embodiment, the touch sensor structure 200 can only be disposed on the first substrate 101 of the display panel 100 (not shown), and this embodiment is also the In-cell Touch disposed in the display panel 100. In another embodiment, the touch sensor structure 200 can be disposed on the second substrate and the first substrate at the same time. In this embodiment, the touch sensor structure 200 is a Hybrid Touch.

In summary, according to some embodiments of the disclosure, by disposing the edge of the pixel electrode in the slit of the common electrode, and adjusting the relationship of the distances between the edge of the pixel electrode, the slit edge of the common electrode, and the edge of the data line, the bright-state transmittance and maintenance ratio of viewing-angles of the display panel can be maintained within a relatively more stable or higher-value range, or the dark-state transmittance of the display panel can be kept in a relatively more stable or lower-value range. This can improve the quality of the display provided by the display panel. The embodiments described above can be matched with one another as long as they do not conflict with one another. They are not limited to design the design value of a single embodiment.

While the disclosure has been described by way of example and in terms of the embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display panel, comprising:
a first substrate;
a second substrate disposed opposite to the first substrate;
a display medium layer disposed between the first substrate and the second substrate;
a first scan line and a second scan line adjacent to the first scan line disposed on the first substrate;
a common electrode line adjacent to the first scan line or the second scan line, wherein the common electrode line has an enlarged portion, and an extending direction of the common electrode line is substantially the same as an extending direction of the first scan line; and
a first data line and a second data line adjacent to the first data line disposed on the first substrate, wherein the first scan line, the second scan line, the first data line and the second data line intersect to define a pixel area, and the pixel area comprising:
a pixel electrode disposed on the first substrate;
a common electrode disposed on the pixel electrode; and
an insulating layer disposed between the pixel electrode and the common electrode,
wherein a contact hole is formed in the insulating layer, the common electrode line is electrically connected to the common electrode through the contact hole, and the enlarged portion overlaps the contact hole,
wherein in a direction perpendicular to the extending direction of the common electrode line, the enlarged portion has a maximum width, a part of the common electrode line overlapping the first data line has a maximum width, and the maximum width of the enlarged portion is greater than the maximum width of the part of the common electrode line,
wherein a part of the pixel electrode overlaps the common electrode line.

2. The display panel of claim 1, wherein the enlarged portion has a curved edge.

3. The display panel of claim 1, wherein a part of the common electrode overlaps the common electrode line.

4. The display panel of claim 1, wherein the enlarged portion overlaps the part of the pixel electrode.

5. The display panel of claim 1, wherein the common electrode corresponding to the pixel area includes a first slit and a second slit, the first slit is near the first data line, the second slit is near the second data line, and the enlarged portion overlaps a part of the first slit.

6. The display panel of claim 5, wherein the enlarged portion overlaps a part of the second slit.

7. The display panel of claim 1, wherein the common electrode corresponding to the pixel area includes a first slit and a second slit, the first slit is near the first data line, the first slit has a first edge closest to the first data line, the second slit is near the second data line, the second slit has a second edge closest to the second data line, the pixel electrode has a third edge located in the first slit, the pixel electrode has a fourth edge located in the second slit, and a first distance between the first edge and the third edge is different from a second distance between the second edge and the fourth edge.

8. The display panel of claim 7, wherein the first slit has a first width, a third distance is between the first edge of the first slit and an edge of the first data line closest to the first slit, and a percentage of the third distance divided by the first width is greater than 10% and smaller than 100%.

9. The display panel of claim 7, wherein the second slit has a second width, a fourth distance is between the second edge of the second slit and an edge of the second data line closest to the second slit, and a percentage of the fourth distance divided by the second width is greater than 25% and smaller than 100%.

10. An electronic device, comprising:
a display panel, comprising:
a first substrate;
a second substrate disposed opposite to the first substrate;
a display medium layer disposed between the first substrate and the second substrate;
a first scan line and a second scan line adjacent to the first scan line disposed on the first substrate;
a common electrode line adjacent to the first scan line or the second scan line, wherein the common electrode line has an enlarged portion, and an extending direction of the common electrode line is substantially the same as an extending direction of the first scan line; and
a first data line and a second data line adjacent to the first data line disposed on the first substrate, wherein the first scan line, the second scan line, the first data line and the second data line intersect to define a pixel area, and the pixel area comprising:
a pixel electrode disposed on the first substrate;
a common electrode disposed on the pixel electrode; and
an insulating layer disposed between the pixel electrode and the common electrode,
wherein a contact hole is formed in the insulating layer, the common electrode line is electrically connected to the common electrode through the contact hole, and the enlarged portion overlaps the contact hole,
wherein in a direction perpendicular to the extending direction of the common electrode line, the enlarged portion has a maximum width, a part of the common electrode line overlapping the first data line has a maximum width, and the maximum width of the enlarged portion is greater than the maximum width of the part of the common electrode line,
wherein the common electrode corresponding to the pixel area includes a first slit and a second slit, the first slit is near the first data line, the second slit is near the second data line, and the enlarged portion overlaps a part of the first slit.

11. The electronic device of claim 10, wherein the enlarged portion has a curved edge.

12. The electronic device of claim 10, wherein a part of the pixel electrode overlaps the common electrode line.

13. The electronic device of claim 10, wherein a part of the common electrode overlaps the common electrode line.

14. The electronic device of claim 10, wherein the enlarged portion overlaps a part of the pixel electrode.

15. The electronic device of claim 10, wherein the enlarged portion overlaps a part of the second slit.

16. The electronic device of claim 10, wherein the first slit has a first edge closest to the first data line, the second slit has a second edge closest to the second data line, the pixel electrode has a third edge located in the first slit, the pixel electrode has a fourth edge located in the second slit, and a first distance between the first edge and the third edge is different from a second distance between the second edge and the fourth edge.

17. The electronic device of claim 16, wherein the first slit has a first width, a third distance is between the first edge of the first slit and an of the first data line closest to the first slit, and a percentage of the third distance divided by the first width is greater than 10% and smaller than 100%.

18. The electronic device of claim 16, wherein the second slit has a second width, a fourth distance is between the second edge of the second slit and an edge of the second data line closest to the second slit, and a percentage of the fourth distance divided by the second width is greater than 25% and smaller than 100%.

* * * * *